No. 838,002. PATENTED DEC. 11, 1906.
J. O. C. BRIGGS.
RELEASING DEVICE.
APPLICATION FILED JAN. 24, 1906.
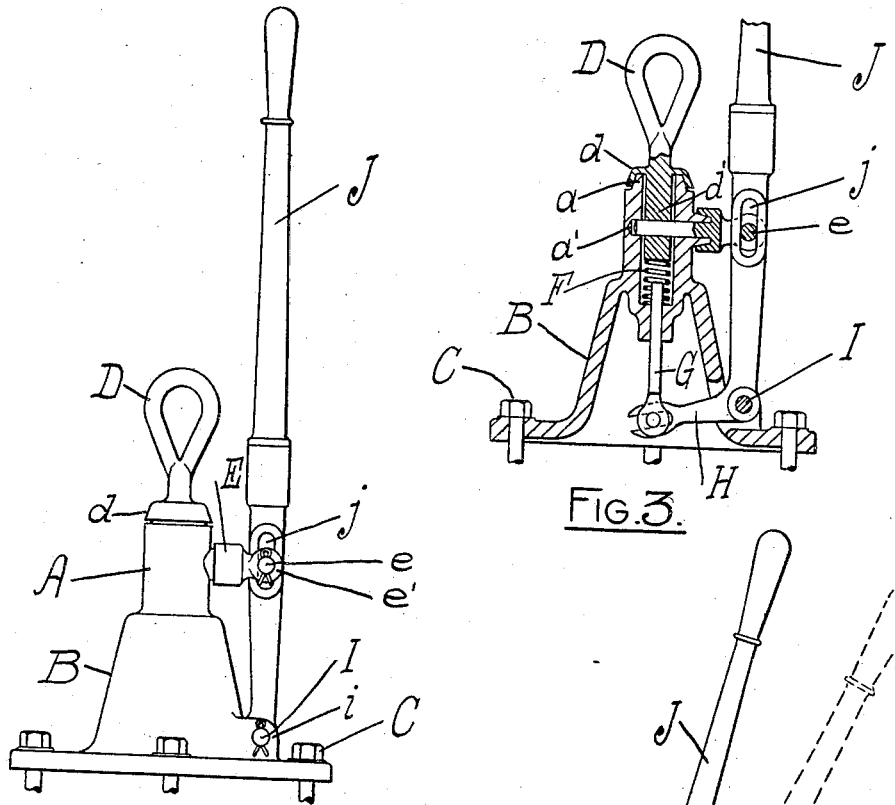
WITNESSES
A.G. Pieczentkowski.
William H. Wright.
INVENTOR.
John O. C. Briggs
Horatio E. Bellows
BY
ATTORNEY.

UNITED STATES PATENT OFFICE.

JOHN O. C. BRIGGS, OF EAST PROVIDENCE, RHODE ISLAND.

RELEASING DEVICE.

No. 838,002.  Specification of Letters Patent.  Patented Dec. 11, 1906.

Application filed January 24, 1906. Serial No. 297,599.

*To all whom it may concern:*

Be it known that I, JOHN O. C. BRIGGS, a citizen of the United States, residing at East Providence, in the county of Providence and State of Rhode Island, have invented certain new and useful Improvements in Releasing Devices, of which the following is a specification, reference being had therein to the accompanying drawings.

My invention relates to releasing devices, of which an eyebolt or analogous retaining element is a constituent part, and has for its object instantaneous and facile release, such as is demanded, for instance, when the eyebolt or other retaining element secures the lashings of a life-boat.

A further object is to insure successful release in a frigid temperature, and it is sought to attain these ends in a simple and cheap structure.

To the above enumerated ends my invention consists, essentially, of a bolt or other element locked in a body or socket by a connection of the operating-lever.

In the drawings, wherein like reference characters indicate like parts throughout the views, Figure 1 is a side elevation of an embodiment of my invention in conjunction with an eyebolt; Fig. 2, a plan thereof; Fig. 3, a vertical central section of the same in locked position, with part of lever-arm broken away; and Fig. 4, a like section showing in full lines the parts in released position and in broken lines the parts in extreme position.

A convenient embodiment of my invention shows the same in conjunction with an eyebolt. The same comprises the body or socket A, supported by legs or a base B, fixed by screws and nuts C to the deck or floor.

The body A is preferably provided with an external inclined annular shoulder $a$ upon its upper end to form a seat for a downwardly-directed annular flange $d$ upon the shank $d'$ of an eyebolt D. The shank or body of the eyebolt has a diametrical opening $d^3$ therethrough to allow the passage of a transverse slidable pin or bolt E, which will be hereinafter referred to. In alinement with the opening $d^3$ and in the wall of the socket A is a recess $a'$, adapted to receive the end of pin E. The bolt D is normally upwardly pressed by a spiral spring F, seated in the lower portion of the body A. The lower end of the body is bored to admit the passage of a pin G, connected with the extremity of a lever-arm H, pivotally mounted upon a pivot-pin I, traversing lugs $i$ on the base B. The lever-arm H has a handle-bar J, extending at right angles thereto, provided with an intermediate vertical oblong slit $j$. Sliding transversely in the slot is a pin $e$, upon which is pivoted through lugs $e'$ the pin or bolt E. The bolt E is provided exterior the body A with a flange $e^2$, adapted to rest against a projection $a^2$ of the body A when the parts are in locked position.

The operation of my releasing mechanism is as follows: The normal or closed position, as shown in Figs. 1, 2, and 3, discloses the eyebolt D held against release by the locking bolt or pin E, whose end rests in the cavity $a'$, the spring F compressed, and the rod or pin G in lowest position. It is understood that the boat lashings or other cable, rope, or device to be tensioned is engaged with the eye of the eyebolt D. In case of emergency the lever-rod J is seized and drawn outwardly to the position shown in full lines in Fig. 4—namely, the pin or bolt E is by the arm J withdrawn from the cavity $a'$ and passage $d^3$, thereby releasing the bolt D, and the spring F forces the latter up and out of its seat in the socket A. The flanges $d$ and $e^2$ are intended as far as possible to protect the parts against the ingress of moisture, frost, and ice, but should the parts become in any manner clogged, congealed, or otherwise impeded I have provided a supplementary means for forcing the eyebolt D from its seat, thus: The rod J is pulled further away to the position shown in broken lines in Fig. 4, whereby the pin G is forced against the bottom of the eyebolt D, thereby pushing the latter from its socket.

What I claim is—

1. In a device of the character described the combination with an eyebolt, of a socket in which the eyebolt is detachably seated, means for upwardly pressing the eyebolt, and means for locking the eyebolt in its seat against the force of said pressing means.

2. In a device of the character described the combination with an eyebolt, of a socket in which the eyebolt is seated, a base upon which the socket is mounted, a lever-arm pivoted to the base, a slidable pin connected with the lever-arm and extending into the socket, a lever-bar upon the lever-arm, and a locking-pin pivoted to the lever-arm and engaging the eyebolt.

3. In a device of the character described the combination with an eyebolt, of a socket in which the eyebolt is seated, a base upon which the socket is mounted, a spring in the socket upwardly pressing the eyebolt, a lever-arm pivoted to the base, a slidable pin upon the lever-arm and extending into the socket in alinement with the eyebolt, a lever-bar upon the lever-arm, and a locking-pin connected with the lever-arm and engaging the eyebolt.

In testimony whereof I have affixed my signature in presence of two witnesses.

JOHN O. C. BRIGGS.

Witnesses:
 HORATIO E. BELLOWS,
 WILLIAM H. WRIGHT.